United States Patent Office 3,352,638
Patented Nov. 14, 1967

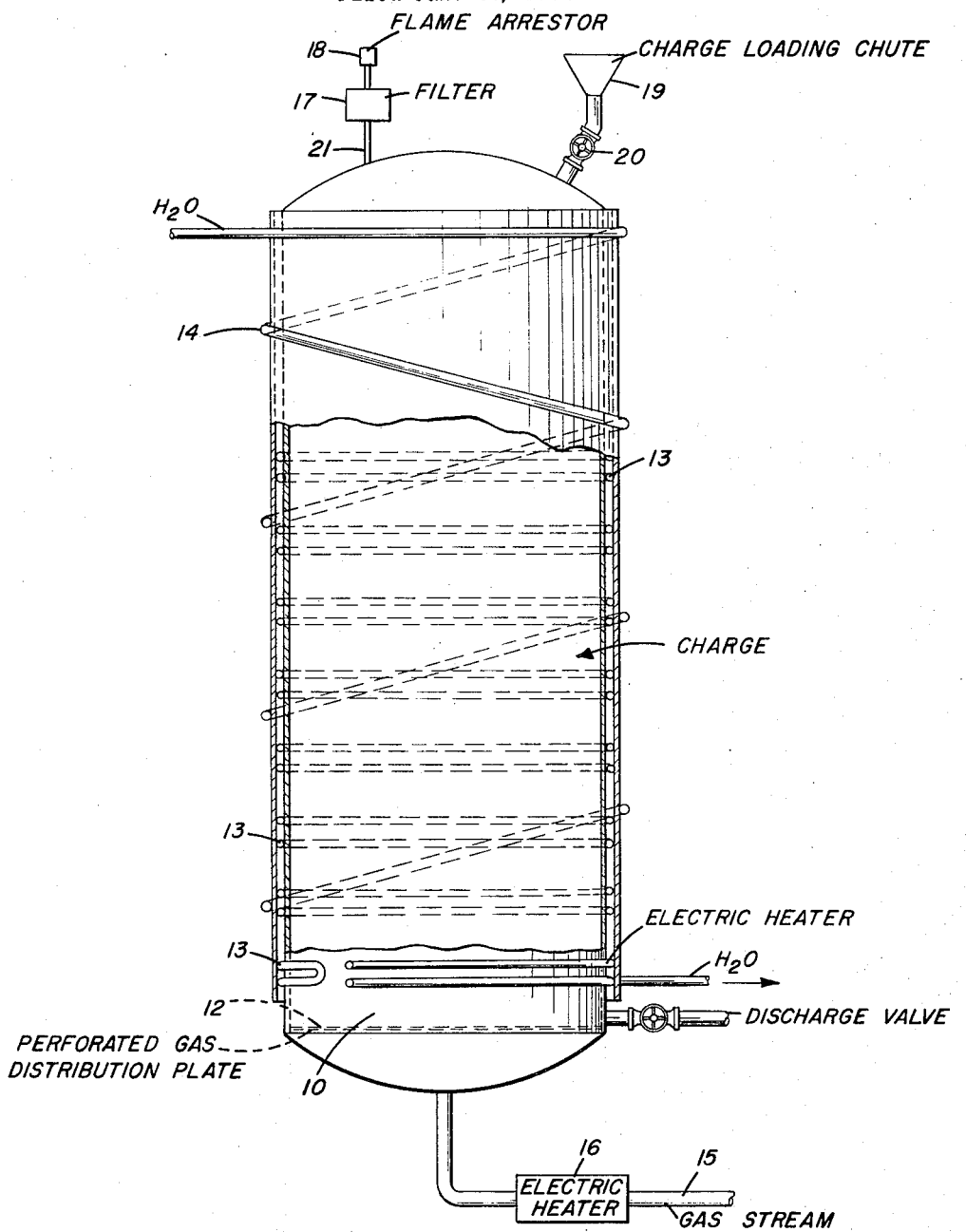

3,352,638
PROCESS FOR MANUFACTURING
MAGNETIC OXIDE
John S. Perlowski and William E. Sillick, Rochester, N.Y., assignors to Eastman Kodak Company, Rochester, N.Y., a corporation of New Jersey
Filed Jan. 30, 1964, Ser. No. 341,238
5 Claims. (Cl. 23—200)

This invention relates to the manufacture of magnetic iron oxide and more particularly to an improved process for the conversion of alpha ferric oxide to gamma ferric oxide.

As is well known, the starting material for the manufacture of magnetic iron oxide is alpha $Fe_2O_3$ or alpha $Fe_2O_3.H_2O$. This is converted to the magnetic gamma form by reduction to $Fe_3O_4$ and re-oxidation to gamma $Fe_2O_3$. The reduction is carried out by heating the oxide in the presence of a reducing atmosphere such as hydrogen, natural gas, methane, ethane acetone vapors, etc. The $Fe_3O_4$ is then allowed to cool and is reoxidized with air.

The reaction is normally carried out in a large rotating drum such as a calciner. There are usually internal fins for agitation of the powder. The reducing gas is introduced through a rotary joint at one end. The vent gases are drawn off at the other. The calciner is rotated by means of a centerless drive and external heat is provided from a series of gas jets or electrical resistance heaters.

After a charge of $Fe_2O_3$ or alpha $Fe_2O_3.H_2O$ is placed in the calciner, the reducing gas is introduced and the charge heated to 300–400° C. When completely reduced to $Fe_3O_4$ the calciner is cooled to about 100° C. by ambient cooling. Air, as the source of oxygen, is now introduced and the oxidation begins. Once started, the oxidation process will itself provide sufficient heat to continue the oxidation. If the temperature rise is too rapid, the air supply is stopped and the reactor cooled before restarting.

While prior processes following the above procedures are effective, there is need of a better process and the present invention provides it.

An object of the present invention is, therefore, to provide a lower cost, safer and lower maintenance method of converting alpha $Fe_2O_3$ to gamma $Fe_2O_3$ which will produce a product of more uniformity and improved overall quality. Other objects will be apparent hereinafter.

In accordance with one feature of the present invention, these and other objects are attained as follows: a fluidized bed reactor is provided for the conversion of alpha $Fe_2O_3$ to gamma $Fe_2O_3$. The fluidized bed reactor can be a vertical cylinder that is heated with electric resistance heaters or other means. The ferric oxide, alpha $FeO_3.H_2O$ is loaded into the top of the reactor. The particles are suspended by the various gas streams as they pass up through the gas distribution plate of the reactor. The dust is removed from the effluent with a filter. The reactor and contents are cooled with a water coil. The incoming gases are heated with an electric heater.

The reactor is charged with the alpha hydrate $Fe_2O_3.H_2O$ and is heated to 600–800° F. to drive off the water of hydration. Air is introduced at the rate of 0.40 ft./sec. When the desired temperature is reached, the unit is purged for at least ten minutes with nitrogen. The reactor and contents are kept at the desired temperature while hydrogen, or other suitable reducing gases, are introduced into the carrier stream. The reducing gas can be employed in concentrations from 1 to 100 percent. The reduction is complete when the powder is 100% reduced to $Fe_3O_4$. The unit is again purged while it is cooled to 550–700° F. Air is now introduced into the nitrogen stream at a sufficient rate to maintain the desired oxidation temperature. When the oxidation is complete, there is a rapid drop in temperature. The contents are then cooled to 200° F. and dumped. The material produced in this manner is 100% magnetic and exhibits excellent properties when used in magnetic tapes.

Apparatus suitable to be employed in accordance with the present invention in carrying out the processes of the examples given herein is shown schematically in the drawing, wherein the reactor 10 comprises a vertical closed cylinder having a 12-inch inner diameter and a length of 7 feet. Near the bottom is a 20-micron sintered stainless steel gas dispersion plate 12. The unit is heated by sixteen vertical external strip heaters 13. A stainless steel cooling coil 14 is wrapped around the outside of the heaters. Both the coil and the heaters are embedded in a heat transfer cement, not shown. The entire unit is insulated with a conventional insulating material, not shown. Nitrogen, hydrogen and air are supplied as required through conduit 15 which is heated as by an electric heater 16. A filter 17 and flame arrester 18 are installed in conduit 21 leading from the top of the reactor. A charge loading chute 19 having valve 20 is also provided at the top of the reactor. The gas velocity is desirably maintained at approximately 7 standard feet³.

A further understanding of our invention will be had from a consideration of the following examples which are given to illustrate certain preferred embodiments of the instant invention.

Example 1

Twenty pounds of alpha hydrate, $Fe_2O_3.H_2O$ were loaded into the top of the reactor. The agglomerate size was 60–80 mesh. The heaters were turned on and air was employed to fluidize the charge. After one hour, the batch was up to 700° F. and the alpha hydrate was dehydrated. The reactor was purged for ten minutes, then the reduction was started. The gas rates were adjusted to provide a mixture that was 75% nitrogen and 25% hydrogen by volume. The reduction took 22 minutes. The reactor was again purged with nitrogen and cooled with the cooling coil to 550° F. At that temperature, air was bled into the nitrogen stream to maintain the 550° F. reactor temperature. When the oxidation was complete, the temperature dropped and the reaction was complete.

The finished product was essentially all gamma ferric oxide. The oxide had the following properties:

He _____ 305
$\phi R/\phi m$ _____ 73.0
$d\phi/dH$ _____ 76.0

This gamma ferric oxide was dispersed in a binder system and coated on cellulose triacetate support. The properties of the tape were excellent.

In the following examples the apparatus and manipulative steps described in Example 1 were employed, and hence, only the specifications are set forth in tabular form.

|  | Example | | |
|---|---|---|---|
|  | 2 | 3 | 4 |
| Charge | 25 lbs | 75 lbs | 50 lbs. |
| Heat-up time | 1¼ hours | 2 hrs | 1.67 hrs. |
| Reducing gas | 75% $N_2$, 25% $H_2$ | 65.6% $H_2$, 34.4% $N_2$ | 75% $N_2$, 25% acetone. |
| Reduction time | 30 min | 40 min | 40 min. |
| Reduction temp | 800° F | 750° F | 750° F. |
| Oxidation temp | 650° F | 550° F | 650° F. |
| Hc | 335 oersteds | 307 oersteds | 300 oersteds. |
| $\phi R/\phi m$ | 71.3 | 76.2 | 74.7. |
| $d\phi/dH$ | 59 | 65 | 70. |

In carrying out each of the above examples, we also employed the following specifications which we have found are critical for optimum production of magnetic oxide. The gas velocities must exceed 0.122 ft./sec. to achieve fluidization yet be less than 0.5 ft./sec. to avoid excessive carryover. The length to diameter ratio of the bed must exceed 1 to obtain uniform product. A realistic upper limit for this ratio is 10:1. The agglomerate size range of the oxide charge should be 60–120 mesh. Larger agglomerates are only partly reacted, smaller ones are carried out of the reactor.

While we have described herein suitable apparatus for carrying out our novel process, variations of this apparatus could be effectively employed. For example, gas heating could replace electric heating; square or rectangular reactor chamber could be employed and other reducing agents such as natural gas, methane, ethane, etc., will work effectively.

This invention has been described in detail with particular reference to preferred embodiments thereof, but it will be understood that variations and modifications can be effected within the spirit and scope of the invention as described hereinabove and as defined in the appended claims.

We claim:

1. A method of making gamma $Fe_2O_3$ which comprises introducing a charge of alpha $Fe_2O_3 \cdot H_2O$ into a fluidizing bed reactor, fluidizing the charge by introducing air under pressure, heating the charge during fluidization to 600–800° F. to drive off the water of hydration, purging the reactor and continuing fluidizing with an inert gas, substantially completely reducing the alpha $Fe_2O_3$ to $Fe_3O_4$ by continuing fluidizing with a reducing gas, again purging the reactor and continuing fluidizing with an inert gas while cooling the charge to 550–700° F., continuing fluidizing within the latter temperature range with an inert gas-air mixture to oxidize $Fe_3O_4$ to gamma $Fe_2O_3$, and continuing the oxidation until a rapid temperature drop indicates completion of the oxidation.

2. A method of making gamma $Fe_2O_3$ which comprises introducing a charge of alpha $Fe_2O_3 \cdot H_2O$ into a fluidizing bed reactor, fluidizing the charge by introducing air under pressure, heating the charge during fluidization to 600–800° F. to drive off the water of hydration, purging the reactor and continuing fluidizing with an inert gas, substantially completely reducing the alpha $Fe_2O_3$ to $Fe_3O_4$ by continuing fluidizing with nitrogen, substantially completely reducing the alpha $Fe_2O_3$ to $Fe_3O_4$ by continuing fluidizing with hydrogen-containing gas, again purging the reactor and continuing fluidizing with nitrogen while cooling the charge to 550–700° F., continuing fluidizing within the latter temperature range with a nitrogen-air mixture to oxidize $Fe_3O_4$ to gamma $Fe_2O_3$, and continuing the oxidation until a rapid temperature drop indicates completion of the oxidation.

3. A method of making gamme $Fe_2O_3$ which comprises introducing a charge of alpha $Fe_2O_3 \cdot H_2O$ into a fluidizing bed reactor, fluidizing the charge by introducing air under pressure, heating the charge during fluidization to 600–800° F. to drive off the water of hydration, purging the reactor and continuing fluidizing with nitrogen, substantially completely reducing the alpha $Fe_2O_3$ to $Fe_3O_4$ by continuing fluidizing with hydrogen-containing gas, again purging the reactor and continuing fluidizing with nitrogen while cooling the charge to 550–700° F., continuing fluidizing within the latter temperature range with a nitrogen-air mixture to oxidize $Fe_3O_4$ to gamma $Fe_2O_3$, and continuing the oxidation until a rapid temperature drop indicates completion of the oxidation, the velocities of the gases being within the range of 0.122 to 0.5 ft./sec. and the agglomerate size range of the charge being 60–120 mesh.

4. The method of claim 3 in which the length to the diameter ratio of the reaction space exceeds 1.

5. The method of claim 3 in which the upper limit of the ratio of the length to the diameter of the reaction space is 10:1.

References Cited

UNITED STATES PATENTS 2,596,954  5/1952  Heath _____ 23—200
2,693,409  11/1954  Stephens _____ 23—200

OSCAR R. VERTIZ, *Primary Examiner.*

J. J. BROWN, G. L. OZAKI, *Assistant Examiners.*